B. KEVIL.
VEHICLE FENDER.
APPLICATION FILED JAN. 28, 1918.

1,282,858.

Patented Oct. 29, 1918.
2 SHEETS—SHEET 1.

Witnesses:
Clarence Pender
Irene Parker.

Inventor
Blanche Kevil
By James N. Ramsey
Attorney.

B. KEVIL.
VEHICLE FENDER.
APPLICATION FILED JAN. 28, 1918.
1,282,858.
Patented Oct. 29, 1918.
2 SHEETS—SHEET 2.
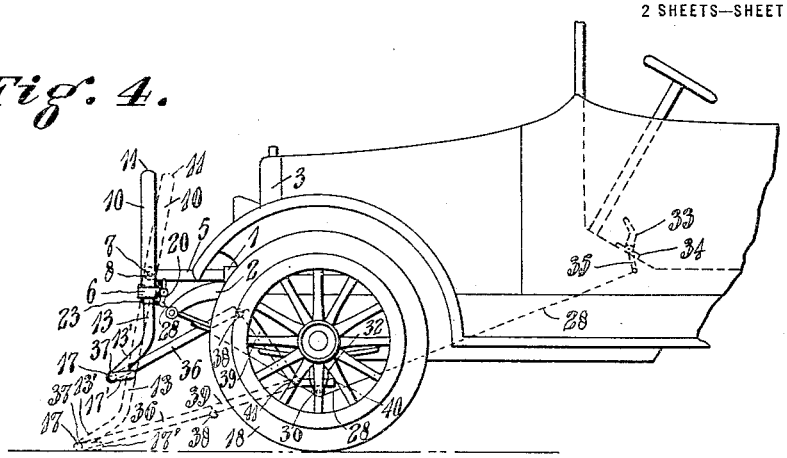
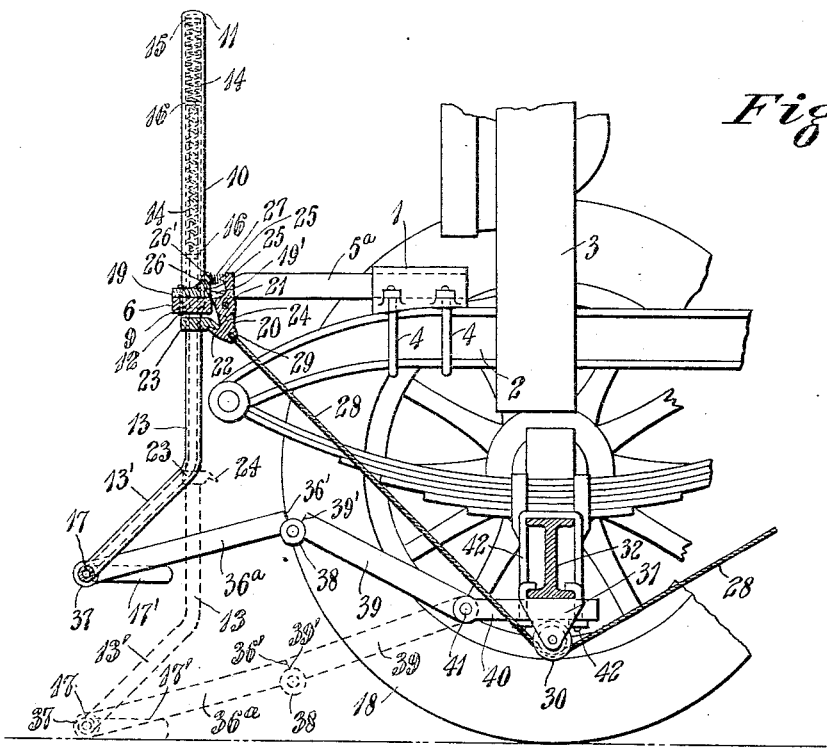
Witnesses:
Clarence Pardew
Irene Parker.
Inventor
Blanche Kevil
By James N. Ramsey
Attorney.

UNITED STATES PATENT OFFICE.

BLANCHE KEVIL, OF COVINGTON, KENTUCKY.

VEHICLE-FENDER.

1,282,858.  Specification of Letters Patent.  Patented Oct. 29, 1918.

Application filed January 28, 1918. Serial No. 214,127.

*To all whom it may concern:*

Be it known that I, BLANCHE KEVIL, a citizen of the United States, and a resident of Covington, in the county of Kenton and State of Kentucky, have invented certain new and useful Improvements in Vehicle-Fenders, of which the following is a specification.

My invention relates to fenders, and its object is to provide against serious injury to persons subjected to collision by vehicles, and more especially for use on road vehicles, such as automobiles.

My invention consists in the combination of parts and in the details of construction and arrangement of parts as will hereinafter be more fully described and claimed.

In the drawing:

Fig. 4 is a side elevation on a reduced scale of the front part of the automobile with the invention applied thereto, the device being represented in its lower position by dotted lines and the releasing treadle and its connection being also shown by dotted lines; and Fig. 5 is a longitudinal vertical section similar to Fig. 2, but showing a modification of my invention.

Figure 1:
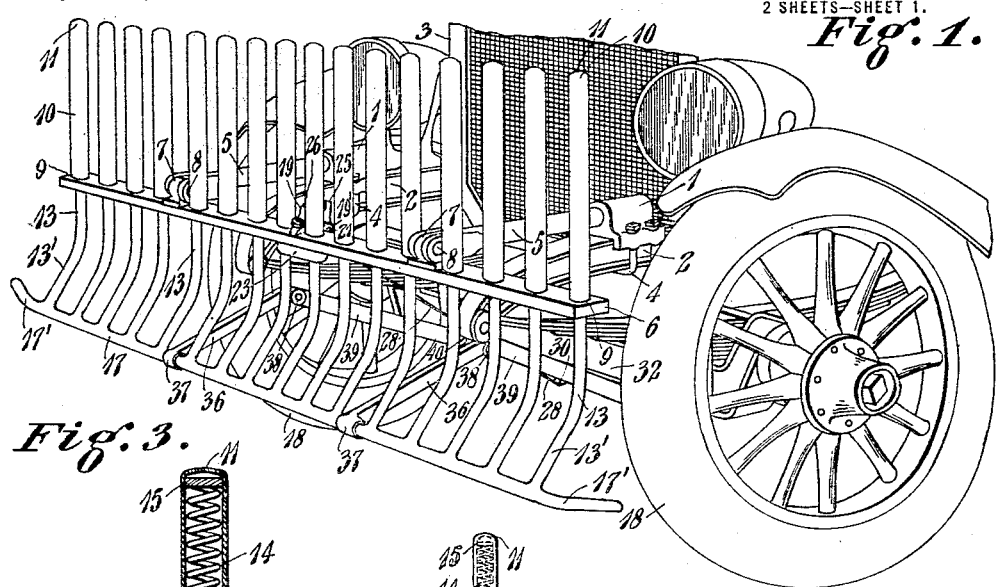
Figure 1 is a perspective view of the front part of an automobile equipped with my invention.

As I prefer to construct my invention, there are clamping heads 1 clamped to the side frame members 2 just forward of the radiator 3 of the automobile by U-bolts 4. Fixed in these clamping heads 1 and extending forward are forks 5. A relatively wide flat bar 6 extends transversely under the forks 5 and has fixed to it and extending upward between the members of the respective forks, ears 7 with pins 8 through the fork members and ears, so that the bar 6 may swing forwardly and backwardly.

At suitable intervals throughout the length of this bar 6 there are sockets 9 opening upwardly and receiving the lower ends of respective tubular casings 10, each extending upward a considerable distance from the bar 6 and with their tops 11 closed. The bar 6 also has openings 12 continuous with the interiors of the respective casings 10 down through the bottom of the bar 6, and upright members 13, preferably tubular, as shown, extending through these openings 12 each a considerable distance upward in the respective casings 10. Helical springs 14 are confined between the upper ends of the upright members 13 and the tops 11 of the casings 10; there preferably being disks 15 and 16 above and below these springs, respectively, against the upper ends of the members 13 and the tops 11 to form proper bearings for the ends of the springs 14. The upright members 13 extend downwardly and curve forwardly into forwardly and downwardly inclined straight parts 13' which have their lower ends all rigidly secured to a long transverse lower bar 17 which is also preferably tubular; the ends of the parts 13' preferably being brazed or welded to the tubular bar 17. The end parts 17' of the bar 17 extend a considerable distance past the last parts 13' at the respective sides, and preferably curve somewhat backwardly; it being understood that these extensions 17' extend in front of the wheels 18 of the automobile.

Midway of the length of the bar 6, there is attached thereto a bracket 19 with a fork 19' extending rearwardly and downwardly, between the members of which is pivoted a latch member 20 by means of a transverse pin 21. This latch member 20 extends down and has a forwardly, upwardly inclined hook part 22. A collar 23 is fixed around one of the upright members 13 just below the bar 6, which collar 23 has, extending backwardly and downwardly, a nose 24 up under which the hook part 22 of the latch member 20 normally engages to hold up against the action of gravity and of the springs 14 the entire structure made up of the upright members 13 and the transverse lower bar 17. This latch member 20 also has extending upward from its pivot a short arm 25 and the bracket 19 has a lug 26 extending upward some distance forwardly of the arm 25, and between these is compressed a short helical spring 27 held in place on lugs 25' and 26' on the arm and lug, respectively. This spring 27 thus yieldably holds the latch member 20 in position to keep its hook part 22 engaged under the nose 24. A flexible tension element 28 such as a rope or cable is connected to an eye 29 on the lower end part of the latch member 20, and passes down under a sheave 30 journaled in a bracket 31 suitably clamped on the axle 32 of the automobile and then passes rearwardly and upwardly. A treadle 33 (Fig. 4) is pivoted in a bracket 34 inside the body of the automobile, and has an arm 35 extending down with the rear end of the tension element 28 connected to it; so that when the treadle is pressed forward by the foot of the driver of the automobile, the latch member 20 has its hook part 22 disengaged from the nose 24, allowing the fender structure made up of the elements 13 and 17 to drop and be forced down by the springs 14.

Brace members 36 have their front ends in the form of hubs 37 around the transverse lower bar 17 of the fender structure and their rear ends have a rule-joint 38 with the forward ends of rear brace members 39, which, in turn, have their rear ends pivoted to brackets 40 by means of pins 41; these brackets 40 being rigidly secured to the under side of the automobile axle 32 by U-bolts 42. The pivot of the rule-joint 38 is substantially coincident with the lower edges of the brace members 36 and 39; and when the fender structure is in raised position, the jointed braces thus made up of these members 36 and 39 are folded upwardly. But when the fender structure drops, the jointed braces tend to straighten, and by their weight force the lower part of the fender structure forward; this forward swinging being permitted by the pivotal mounting on the forks 5 as first described. Thus, the braces become entirely straightened, and preferably, the adjacent ends 36' and 39' of their members 36 and 39, are inclined backward from their pivot sufficiently to allow these members to pass a substantial distance below an alined relation when the action is completed. Thus, when the fender structure has dropped, these braces will effectually hold the lower part of the structure forward and will not collapse until the connection of their members has been brought above a position of alinement again.

In the modification shown in Fig. 5, the device is made up of the parts just described, excepting that the forks 5 have substituted for them merely struts 5ª rigidly secured to the upper side of the transverse bar 6, and the forward brace members 36ª are considerably shorter; being so proportioned that the operation of the brace when the fender structure goes down will be such as to merely compensate for the slight increase in distance between the lower bar 17 of the fender structure and the rear pivots 41 of the braces. It will be seen that the operation of the collapsible braces here is to permit the free up and down movement of the fender structure without necessitating any forward and rearward swinging thereof; thus permitting it to be rigidly mounted by means of the struts 5ª as just described.

Figure 3:
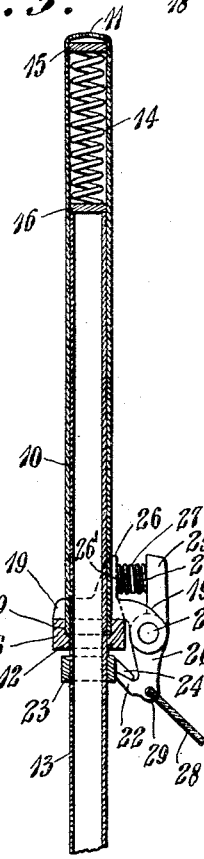
Fig. 3 is an enlarged partial vertical section on a plane through the center of one of the upright tubes and its casing.
Figure 2:
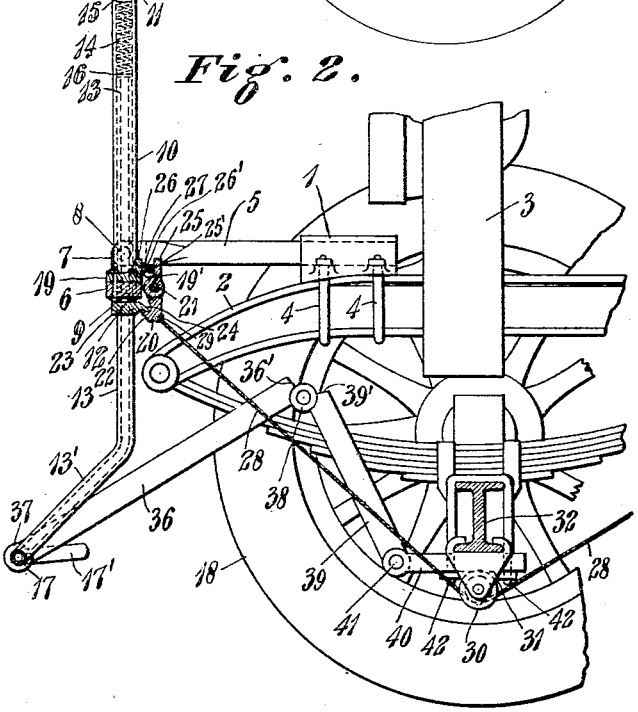
Fig. 2 is a longitudinal vertical section of the same on a vertical plane through the latch.

This modification as shown in Fig. 5 is superior to the other example of Figs. 1 to 4, inclusive, in respect of simplicity of construction and operation; but by causing a forward swinging of the lower part of the fender structure at the same time that it goes down, as in Figs. 1 to 4, the forwardly and downwardly inclined parts 13' and the transverse lower bar 17 are projected under the body of the person collided with, thus tending to raise the body and prevent its being dragged along the ground; thereby further guarding against serious injury to the person.

With my invention thus provided on the automobile or other vehicle, the driver, when he sees that a collision is imminent with a pedestrian, simply presses the treadle 33 with his foot, instantly releasing the fender structure, which is very quickly brought down, not merely by the action of gravity but by the springs 14. He will, of course, stop the vehicle as quickly as possible; but the action of the fender is to guard against the pedestrian being run over by the wheels of the vehicle before the vehicle could be stopped; and, where the fender has both the downward and the forward and upward swinging motions, the effect is also to wholly or partially raise the pedestrian from the ground, carrying him forward on the fender. After the vehicle has been stopped and the pedestrian rescued, the fender is returned to normal condition by pressing upward on the braces, so that they will collapse, and then raising the fender structure until it is again held by the latch member 20. The lower side of the hook part 22 and upper side of the nose 24 are so inclined that the latch member 20 will yield backward and then pass forward under the nose 24; effecting this latching operation automatically. Where the fender is mounted to swing forwardly and rearwardly, as in Figs. 1 to 4, the tension element 28 and treadle 33 are so provided that the element 28 is somewhat slack except when the treadle is pushed forward; so that there is no liability that the latch member 20 will be pulled from under the nose 24 due to the swinging of the fender when the automobile is running; although it will be understood that the weight of the braces against the lower part of the fender will practically prevent any objectionable swinging of the fender at such times.

The fender structure normally being raised a considerable distance above the road surface, it is especially adapted for road vehicles which have freely acting springs, and which must travel over very irregular surfaces; so that a fender that extended either downwardly or forwardly any considerable distance under normal conditions would be constantly striking sudden rises in the roadway, or even level roadway on account of the considerable up and down movement of the vehicle frame on which the fender is mounted. These are conditions peculiar to road vehicles, as distinguished from vehicles running on rails, where the spring action is not so free and the tracks are generally built to straight grades, and there are no abrupt up and down variations in the roadway. Also, any considerable forward extension of a fender is highly objectionable on an automobile or similar vehicle where appearance of the vehicle and freedom to move about in crowded thoroughfares are important considerations.

It will be seen, therefore, that my invention is peculiarly applicable to road vehicles, i. e., those other than vehicles running on rails or other definitely laid out and graded path. However, except in such details as make it peculiarly a device for this purpose, I do not wish to be understood as being limited to the precise illustrations and descriptions herein contained, but having fully described certain examples of my invention, what I claim as new and desire to secure by Letters Patent is:

1. In a vehicle fender, a movable fender structure, substantially straight guiding means for said structure whereby said structure is held either in or out of fending position, said guiding means being pivoted, whereby said guiding means and said fender structure may swing in fending direction, a collapsible brace connected to said structure to extend as said structure moves into fending position and thereby swing said structure in said direction and reinforcing said structure when said structure is in fending position, and means to connect said fender to a vehicle.

2. In a vehicle fender, a movable fender structure, substantially straight guiding means for said structure whereby said structure is held either in or out of fending position, said fender structure being movable into fending position under the action of gravity, means to supplement said action, means to normally restrain said structure out of fending position, a collapsible brace reinforcing said structure when said structure is in fending position, and means to connect said fender to a vehicle.

3. In a vehicle fender, a movable fender structure, substantially straight guiding means for said structure whereby said structure is held either in or out of fending position, said fender structure being movable into fending position under the action of gravity, means to supplement said action, means to normally restrain said structure out of fending position, said guiding means being pivoted, whereby said guiding means and said fender structure may swing in fending direction, a collapsible brace connected to said structure to extend as said structure moves into fending position and thereby swing said structure in said direction and reinforcing said structure when said structure is in fending position, and means to connect said fender to a vehicle.

4. In a vehicle fender, a transverse bar, a fender structure comprising an upright member slidable up and down through said bar, a latch having a part engaging with said bar and a part engaging with said upright member, supporting means connected to said bar and adapted to be connected to part of a vehicle, means to connect said bar to said vehicle, and a brace pivotally connected to said fender structure and adapted to be pivotally connected to part of said vehicle.

5. In a vehicle fender, a transverse bar, a fender structure comprising an upright member slidable up and down through said bar, a latch having a part engaging with said bar and a part engaging with said upright member, supporting means connected to said bar and adapted to be connected to part of a vehicle, means to connect said bar to said vehicle, and a collapsible brace pivotally connected to said fender structure and adapted to be pivotally connected to part of said vehicle.

6. In a vehicle fender, a transverse bar, a fender structure comprising an upright member slidable up and down through said bar, a latch having a part engaging with said bar and a part engaging with said upright member, and supporting means to pivotally connect said bar to part of a vehicle, whereby said fender structure may swing forwardly or rearwardly of the vehicle.

7. In a vehicle fender, a transverse bar, a fender structure comprising an upright member slidable up and down through said bar, a latch having a part engaging with said bar and a part engaging with said upright member, supporting means to pivotally connect said bar to part of a vehicle, whereby said fender structure may swing forwardly or rearwardly of the vehicle, and a collapsible brace pivotally connected to said fender structure and adapted to be pivotally connected to part of said vehicle.

8. In a vehicle fender, a transverse bar, an upright tubular casing mounted on said bar and opening downwardly, a fender structure comprising an upright member slidably fitting up in said casing, means to connect said bar to a part of a vehicle, and a collapsible brace pivotally connected to said fender structure and adapted to be pivotally connected to part of said vehicle.

9. In a vehicle fender, a transverse bar, an upright tubular casing mounted on said bar and opening downwardly, a fender structure comprising an upright member slidably fitting up in said casing, a spring in the upper part of said casing, means compressing said spring against said upright member to force said fender structure down, and means to connect said bar to a part of a vehicle.

10. In a vehicle fender, a transverse bar, an upright tubular casing mounted on said bar and opening downwardly, a fender structure comprising an upright member slidably fitting up in said casing, a spring in the upper part of said casing, means compressing said spring against said upright member to force said fender structure down, a latch having a part engaging with said bar and a part engaging with said upright member, means to connect said bar to a part of a vehicle, and a collapsible brace pivotally connected to said fender structure and adapted to be pivotally connected to part of said vehicle.

11. In a vehicle fender, a transverse bar, a plurality of tubular casings mounted on and extending up from said bar and opening downwardly therethrough, a fender structure comprising a plurality of upright members slidably fitting up in the respective casings, and supporting elements connected to said bar and adapted to be connected to parts of a vehicle.

12. In a vehicle fender, a transverse bar, a plurality of tubular casings mounted on and extending up from said bar and opening downwardly therethrough, a fender structure comprising a plurality of upright members slidably fitting up in the respective casings, springs in the upper parts of said casings, means compressing said springs against the respective upright members in said casings to force said fender structure down, and supporting elements connected to said bar and adapted to be connected to parts of a vehicle.

13. In a vehicle fender, a transverse bar, a plurality of tubular casings mounted on and extending up from said bar and opening downwardly therethrough, a fender structure comprising a plurality of upright members slidably fitting up in the respective casings, and supporting elements pivotally connected to said bar and adapted to be connected to parts of a vehicle whereby said fender structure may swing forwardly and rearwardly of the vehicle.

14. In a vehicle fender, a movable fender structure, substantially straight guiding means for said structure whereby said structure is held either in or out of fending position, means to connect said fender to a vehicle, and a brace comprising two parts having adjacent ends connected together by a "rule joint" permitting them to collapse upwardly but to engage these ends after slightly passing downwardly through an alined position, one of said brace parts having its other end pivotally connected to the lower part of said fender structure and the other end of the other brace part being adapted to be pivotally connected to a part of said vehicle.

15. In a vehicle fender, a movable fender structure, substantially straight guiding means for said structure whereby said structure is held either in or out of fending position, means to pivotally connect said guiding means to a vehicle whereby said fender structure may swing forwardly or rearwardly of the vehicle, and a brace comprising two parts having adjacent ends connected together by a "rule joint" permitting them to collapse upwardly but to engage these ends after slightly passing downwardly through an alined position, one of said brace parts having its other end pivotally connected to the lower part of said fender structure and the other end of the other brace part being adapted to be pivotally connected to a part of said vehicle.

16. In a vehicle fender, a movable fender structure, substantially straight guiding means for said structure whereby said structure is held either in or out of fending position, means to pivotally connect said guiding means to a vehicle whereby said fender structure may swing forwardly or rearwardly of the vehicle, a brace comprising two parts having adjacent ends connected together by a "rule joint" permitting them to collapse upwardly but to engage these ends after slightly passing downwardly through an alined position, one of said brace parts having its other end pivotally connected to the lower part of said fender structure and the other end of the other brace part being adapted to be pivotally connected to a part of said vehicle, said brace being of such aggregate length as to swing said fender structure forwardly as it comes down, and the lower part of said fender structure being normally inclined forwardly and downwardly, for the purpose set forth.

BLANCHE KEVIL.

Witnesses:
HOMER KEVIL,
CLARENCE PERDEW.